Sept. 17, 1946.  W. M. POZ  2,407,682
TERMINAL WEIGHT
Filed May 15, 1945
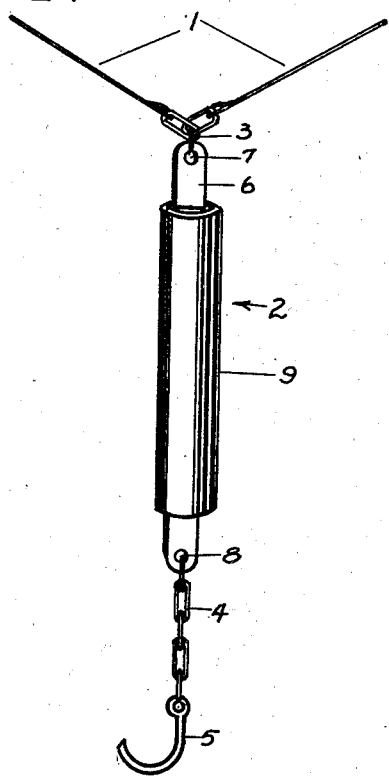
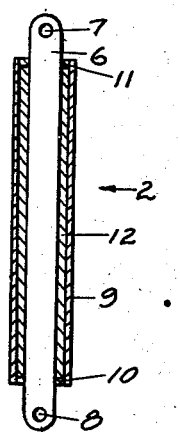
INVENTOR.
WILLIAM M. POZ
BY
Ralph Chappell
ATTORNEY.

Patented Sept. 17, 1946

2,407,682

UNITED STATES PATENT OFFICE 2,407,682

TERMINAL WEIGHT

William M. Poz, United States Navy, Park Ridge, N. J.

Application May 15, 1945, Serial No. 593,899

2 Claims. (Cl. 294—82)

(Granted under the act of March 3, 1883, as amended April 30, 1928; 370 O. G. 757)

This invention relates to an improved terminal weight especially for use with cargo handling equipment.

In cargo handling equipment, especially as used on board ship, it is customary to include a weight between the cargo whip and the cargo hook. The purpose of such a weight is to reduce swinging motion of the hook and any load applied thereto and to keep tension on the whip even though there may be no load carried by the hook.

Heretofore, the weights employed have been of welded construction with a securing means welded to both the top and the bottom of the weight. The upper securing means is fastened to the whip and the lower securing means is fastened to the cargo hook, usually through a chain. Ordinarily the weights have been of spherical configuration. The arrangement has had the disadvantages that the welded joints were often improperly welded and would break, and further that the spherical weight would swing sufficiently so that it might be dangerous.

It is the principal object of the present invention to provide a terminal weight that has an integral member extending from the whip to the chain that leads to the cargo hook and that thereby eliminates the welded construction heretofore used; to provide a terminal weight which is of cylindrical shape; to provide for lowering the center of gravity of a load to be hoisted and to minimize swinging thereof while being hoisted.

It is a further object of the invention to provide for carrying out the foregoing objects in an economical, facile and efficient manner.

In accomplishing these and other objects of the present invention, I have provided improved details of structure, the preferred form of which is illustrated in the accompanying drawing, wherein:

Fig. 1 is a perspective view of a terminal weight embodying the features of my invention connected to cargo whips and to a cargo hook.

Fig. 2 is a longitudinal vertical sectional view of the terminal weight of my invention.

Referring more in detail to the drawing:

There is shown at 1 a pair of cargo whips such as are used for loading or unloading material from the holds of ships or for otherwise handling heavy or bulky material. The cargo whips ordinarily lead to a boom from which they may be raised or lowered or otherwise moved.

The whips are connected to the terminal weight, designated generally as 2, through the intermediary of the link 3.

At the opposite end of the terminal weight 2 is a chain 4 which supports a cargo hook 5. The hook 5 is adapted to be attached to a load to be lifted by the apparatus.

The terminal weight 2 of my invention comprises an integral bar 6 having an aperture 7 adjacent its upper end and an aperture 8 adjacent its lower end. The upper end of the bar 6 is adapted to be secured to the link 3 which may pass through the aperture 7 to secure the bar to the cargo whip 1. The lower end of the bar 6 is adapted to be secured to the chain 4, a link of which may pass through the aperture 8 to connect the bar 6 to the cargo hook 5. Thus, the weight of any load is carried entirely by the bar 6.

Surrounding the bar 6 is a hollow cylindrical pipe 9. Fitted into the lower end of the pipe 9 is a cap 10 and fitted into the upper end of the pipe 9 is a cap 11. The caps 10 and 11 are provided with slots through which the bar 6 passes.

The space between the bar 6 and the pipe 9 is filled with suitable heavy material 12, such as pig lead which may be poured into the pipe 9 in a molten state.

Operation

A whip and boom arrangement in which my invention is employed may be operated in the usual manner; that is, the hook 5 may be secured to a load to be handled and the whips 1 may be raised or lowered or moved sidewise by suitable means to move the load as desired.

The addition of the weight 2 between the whips 1 and the hook 5 decreases swinging of the hook and load and keeps tension on the whips at all times even though there may be no load on the hook 5.

The cylindrical shape of the weight 2 gives greater stability and, since the weight does not extend outwardly as far as a spherical weight, the swinging that does occur is less dangerous.

Since the weight is entirely carried by the integral bar 6, there is no reliance on welded joints such as may break due to imperfect welding.

While I have shown but one embodiment of my invention, it is apparent that the device is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. A terminal weight for cargo handling equipment comprising an integral tension carrying bar, a substantially cylindrical pipe surrounding said bar, and substantially flat caps fitted into the ends of said pipe and having slots through which said bar extends, the portions of said bar extending beyond said caps being apertured to enable cargo whips and cargo hooks to be secured to said bar, the space in said pipe between the inner wall thereof and said bar being filled with heavy material.

2. The combination with a cargo whip and a cargo hook of a terminal weight comprising an integral tension carrying bar, a substantially cylindrical pipe surrounding said bar, substantially flat caps fitted into the ends of said pipe and having slots through which the end portions of said bar extend, said end portions having apertures outside of said caps, link means engaged with the bar through one of said apertures and connected to the cargo whip, and link means engaged with the bar through the other of said apertures and connected to the cargo hook, the space in said pipe between the inner wall thereof and said bar being filled with heavy material.

WILLIAM M. POZ.